June 12, 1962

F. W. MANNING ET AL 3,038,997

AREA RADIATION MONITOR

Filed Dec. 21, 1959

INVENTORS.
Frank W. Manning
Stanley E. Groothuis
James H. Lykins
John R. Mahoney
Daryl M. Papke

BY

ATTORNEY

INVENTORS.
Frank W. Manning
Stanley E. Groothuis
James H. Lykins
John R. Mahoney
Daryl M. Papke

BY

ATTORNEY

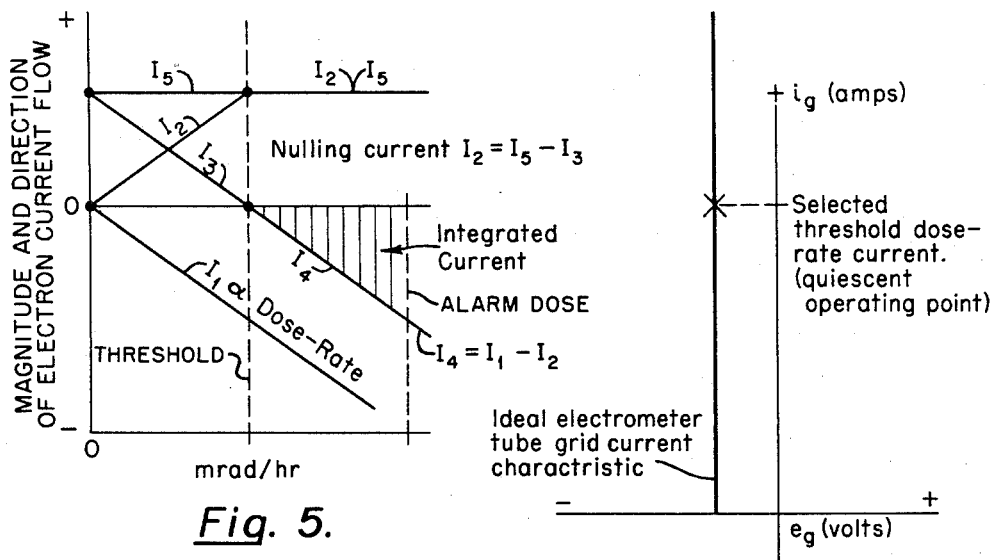
Fig. 5.
Fig. 6.
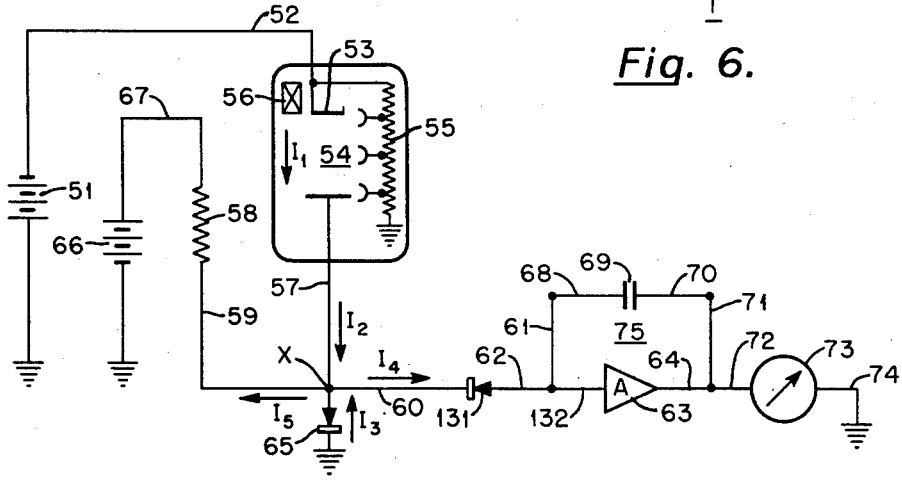
Fig. 7.
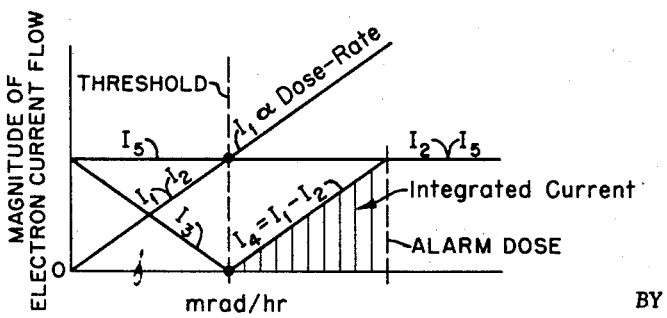
Fig. 8.
INVENTORS.
Frank W. Manning
Stanley E. Groothuis
James H. Lykins
John R. Mahoney
Daryl M. Papke
BY
ATTORNEY INVENTORS.
Frank W. Manning
Stanley E. Groothuis
James H. Lykins
John R. Mahoney
Daryl M. Papke

BY

ATTORNEY

__United States Patent Office__  3,038,997
Patented June 12, 1962

3,038,997
AREA RADIATION MONITOR
Frank W. Manning, Norris, Stanley E. Groothuis, Oak Ridge, James H. Lykins, Knoxville, and John R. Mahoney and Daryl M. Papke, Oak Ridge, Tenn., assignors to the United States of America as represented by the United States Atomic Energy Commission
Filed Dec. 21, 1959, Ser. No. 861,163
10 Claims. (Cl. 250—83.3)

This invention relates to improved area radiation dose monitors which are adapted to compensate continuously for radiation below a threshold dose-rate and to give warning when the dose integral of the dose-rate of an above-threshold radiation excursion exceeds a selected value.

In the design of area radiation monitors adapted to give warning of nuclear excursions, criticality accidents, and the like, instruments of the conventional dose-rate type have various disadvantages. For example, where a plurality of these dose-rate monitors are deployed about an area for monitoring, an extremely high and unpredictable dose-rate accompanying a sudden nuclear excursion or the like will cause many, if not all, of the monitors to give an alarm. As a result, the location of the radiation source cannot be accurately determined. In addition, conventional dose-rate monitors are subject to giving false alarms in the sense that they respond to high dose-rates whether or not a biologically significant amount of radiation (dose) has been received.

Most radiation dose monitors have the disadvantage of integrating even low level incident radiation, such as that generated by a nearby portable source which is under administrative control, and therefore such monitors also tend to give false alarms indicating the occurrence of an uncontrolled burst of radiation.

Some radiation dose monitors of the prior art were provided with means for compensating for incident radiation below a threshold but the compensation was accomplished at the expense of frequent "dead" periods during which the monitors were incapable of alarming.

With a knowledge of the deficiencies of prior area monitors, it is a primary object of this invention to provide a radiation dose monitor which continuously compensates for all incident radiation that is characterized by dose-rates below a selected threshold value.

It is another object of this invention to provide a radiation dose monitor which will integrate the incident radiation for any excursion whose dose-rate exceeds the selected threshold value, but which does not integrate but compensates for incident radiation below this threshold.

It is still another object of this invention to provide a radiation dose monitor which gives a warning when the incident integrated radiation above the selected threshold reaches a value corresponding to a selected radiation dose.

It is a further object of this invention to provide a radiation dose monitor which is inexpensive, but which will not give alarms due to the presence of continuous incident radiation below the selected threshold.

These and other objects and advantages of this invention will become apparent upon a consideration of the following detailed specification and the accompanying drawings, wherein:

FIG. 5 is a graph illustrating the principles of operation of the system of FIG. 1;

FIG. 6 is a graph presenting idealized grid-current-grid-voltage characteristics of the electrometer tube of the system of FIG. 1;

FIG. 7 is a schematic wiring diagram of another embodiment of this invention;

FIG. 8 is a graph illustrating the principles of operation of the embodiment of FIG. 7;

The above objects have been accomplished in the present invention by providing means for continuously charging an ionization chamber. The chamber provides a first current proportional to the incident radiation dose-rate. Means are provided for generating a second current including means for nulling out the first current with the second current at all values of the first current corresponding to dose rates below a selected threshold dose rate value. The second current has a maximum value corresponding to that of the first current at the threshold dose rate. The excess of the first current over the second current, which occurs above the threshold, is integrated and an alarm is given at a selected integrated value of the excess corresponding to a selected radiation dose.

Figure 1:
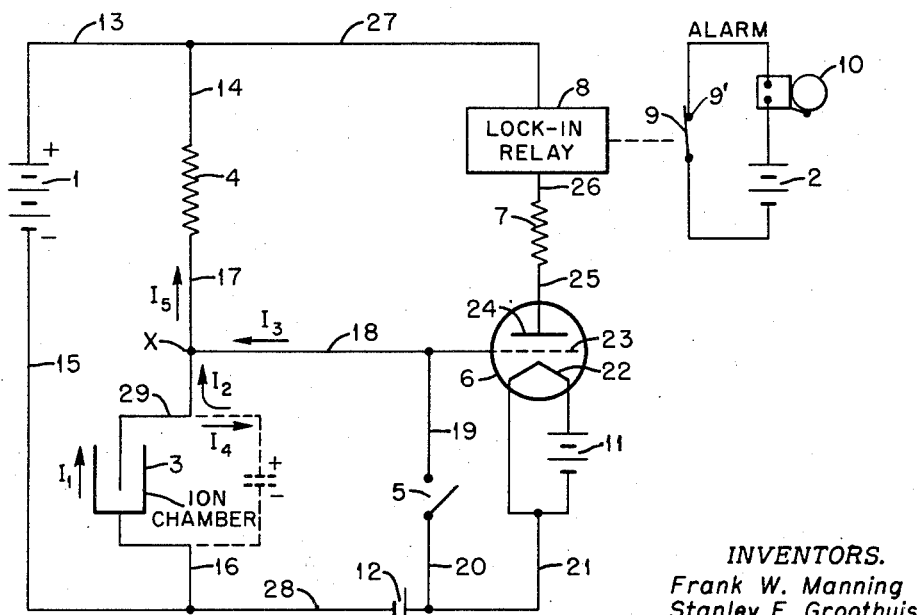
FIG. 1 is a schematic wiring diagram of a preferred embodiment of this invention.

Refer now to FIG. 1 which illustrates a preferred embodiment in which the principles of this invention may be carried out. The positive terminal of a direct power supply 1 is connected by a line 13, line 14, a charging resistor 4, a line 17 and a line 29 to the inner electrode of an ionization chamber 3. The outer electrode of chamber 3 is connected to the negative terminal of supply 1 by leads 16 and 15. The outer electrode of chamber 1 is also connected by leads 16 and 28 to the negative terminal of a grid biasing supply 12.

The positive terminal of power supply 1 is connected by line 13 and line 27 to one side of a lock-in relay 8. The other side of relay 8 is connected by a line 26, load resistor 7, and line 25 to the plate 24 of a control tube 6. The grid 23 of tube 6 is connected to the junction X of lines 29 and 17 by a line 18. Heater current for the filament 22 of tube 6 is supplied by a battery 11. The heater circuit is connected by a line 21 to the positive terminal of grid-biasing supply 12. The positive terminal of supply 12 is also connected to the grid 23 of tube 6 and to line 18 by a lead 20, reset switch 5, and lead 19.

Lock-in relay 8 is provided with contacts 9 and 9' which are closed when the relay is de-energized because of insufficient current flow therethrough from the plate circuit of tube 6. Contacts 9 and 9' of relay 8 are connected in a series circuit with an alarm 10 and a battery 2.

From the above circuit connections, it can be seen that the grid circuit for the tube 6 includes both the biasing supply 12 and the ionization chamber 3. The polarity of the charged ionization chamber is opposite to that of the grid-biasing supply, so that during normal operation the effective grid voltage is essentially the difference between the potentials across the chamber 3 and across the supply 12. The grid of the tube normally is biased negative.

The operation of the circuit of FIG. 1 will now be described. This operation can be readily understood by briefly considering circuit operation when the chamber 3 is (a) exposed to no gamma radiation; (b) exposed only to gamma radiation below the preselected dose-rate threshold; and (c) exposed for thirty seconds or less to gamma radiation equalling or exceeding the preselected alarm dose. The threshold (defined as that radiation rate below which the chamber 3 remains virtually fully charged) will be assumed to be 100 mrad./hr., and the alarm dose to be 5 mrad. within 30 seconds.

Figure 2:
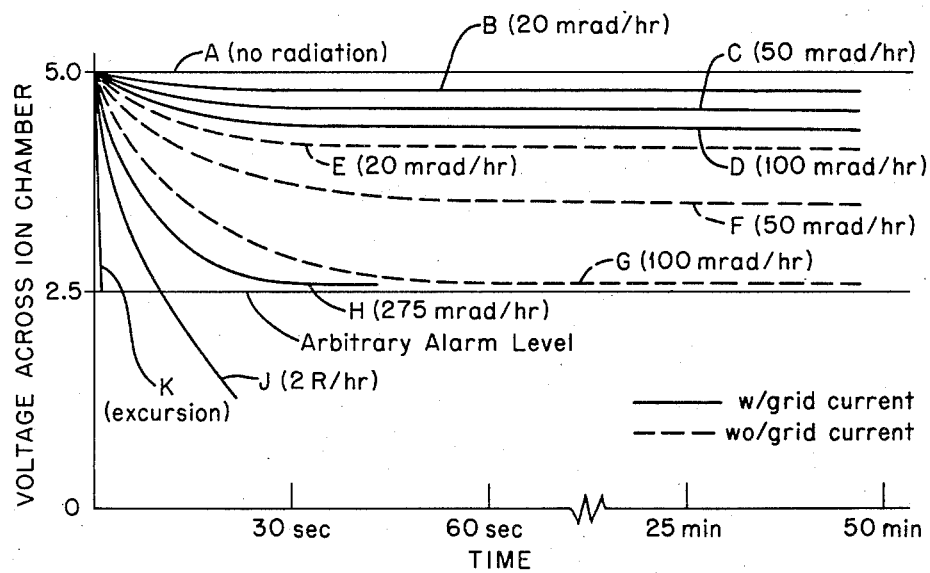
FIG. 2 is a graph, not to scale, presenting selected operating characteristics of the system of FIG. 1, when exposed to fields of radiation in a step-wise manner; the solid-line curves represent operation with positive grid current and the broken-line curves represent operation without positive grid current.

In the absence of a radiation field, the normal operating condition of the system is as follows: (1) The reset switch 5 is open. (2) The ionization chamber is at full operating voltage, having been charged initially either by current flowing to the chamber through the reset switch 5 or by current flowing through the RC circuit comprising the chamber 3 and the resistor 4. The rate at which the chamber is charged through the RC circuit is a function of what will be referred to as the apparent time constant of the circuit. The circuit values are chosen so that the apparent time constant is large, e.g., 12 minutes, compared with the aforementioned 30 second alarm-dose period. (3) The grid potential for tube 6 is at its normal "quiescent" value, and the tube is operating in a region of high positive grid current. The tube is conducting at a selected high value. (4) The relay 8 is energized, holding the contacts 9 and 9' open and thus disabling the alarm circuit. FIG. 2, which is not drawn to scale, indicates at A that the voltage across the chamber 3 remains at full operating value in the absence of radiation.

In the presence of a below-threshold, steady-state background field of, say 20 mrad./hr., the chamber 3 tends to discharge linearly at a rate dependent on the capacitance of the chamber and the ion current to the chamber. The incipient decrease in the voltage across the chamber drives the grid of the tube 6 slightly more negative, producing a relatively large decrease in the aforementioned grid current. As a result, a larger proportion of a constant charging current (to be described) is made available for charging the chamber and maintaining it close to its normal operating charge. In a short time, which is inversely proportional to the slope of the curve of FIG. 3, the discharge current and the charging current come to equilibrium. The circuit values have been selected so that the following conditions now obtain: (1) The chamber voltage has decreased slightly to a steady-state value corresponding to the amount of background radiation. (2) The effective voltage on the grid of tube 6 has increased a small aamount in the negative direction. (3) The plate current is now at a lower value, but is sufficient to maintain the relay 8 in the energized state. (4) The alarm circuit is still disabled. (5) The sensitivity of the chamber to a prompt radiation dose is virtually unchanged. Curves B and C of FIG. 2 illustrate how the ionization chamber voltages decrease to steady-state values corresponding to a background radiation of 20 mrad./hr. and 50 mrad./hr., respectively. Despite the continuous background, the system is operating well above the alarm point—i.e., the voltage across the chamber 3 is such that the effective grid voltage on tube 6 is well above the value corresponding to the alarm point. As indicated by curve D of FIG. 2, increasing the background field to the value—100 mrad./hr.—will reduce the chamber voltage by only a small percentage if there is grid current from tube 6. With grid current, background fields up to 275 mrad./hr. can be compensated for before the system is brought virtually to the alarm point, as indicated by curve H. Curve G represents the corresponding tolerable background field in the absence of grid current.

If the above system receives an alarm dose from an excursion, the ionization chamber 3 discharges essentially linearly at a rate much higher than the charging rate. As mentioned above, the alarm system is designed to have a long charging time constant, thus ensuring a low charging rate for the chamber as compared with its discharge rate for a rapidly accumulated alarm dose. Upon reception of the alarm dose, therefore, the chamber voltage drops below the alarm point, the tube 6 is brought near cut-off, and the contacts 9 and 9' close, energizing the alarm 10. This condition is illustrated in FIG. 2 by curves J and K, both of which represent alarm doses which have occurred when no background radiation is present. It is emphasized that the system energizes the alarm in response to these doses only because in both cases an integrated, or accumulated, dose of at least 5 mrad. is received within thirty seconds or less. The system will not respond to high instantaneous dose-rates unless an alarm dose is received. This is an advantage, since the biological effects of radiation are dependent primarily on dose, and thus an alarm in response to a high-rate excursion delivering less than 5 mrad. would, in this application, be undesirable. After the system has given an alarm, the chamber 3 can be re-charged to normal operating voltage at an accelerated rate by closing the reset switch 5. If the reset switch is left open, the chamber 3 will, in the absence of a high background field, be re-charged automatically in a period of time determined primarily by the time constant of the RC charging circuit.

Without the effects of grid current, the circuit action would be similar in most respects to that of conventional circuits used with an integrating ionization chamber. A comparison of curves B, C, and D with E, F, and G, respectively (FIG. 2), will make it evident that, given the same value of continuous background radiation, the presence of positive grid current permits operation to the no-radiation (chamber fully charged) condition. As indicated by a comparison of curves G and H, the positive grid current permits false-alarm-free operation in the presence of much higher background radiation.

Figure 3:
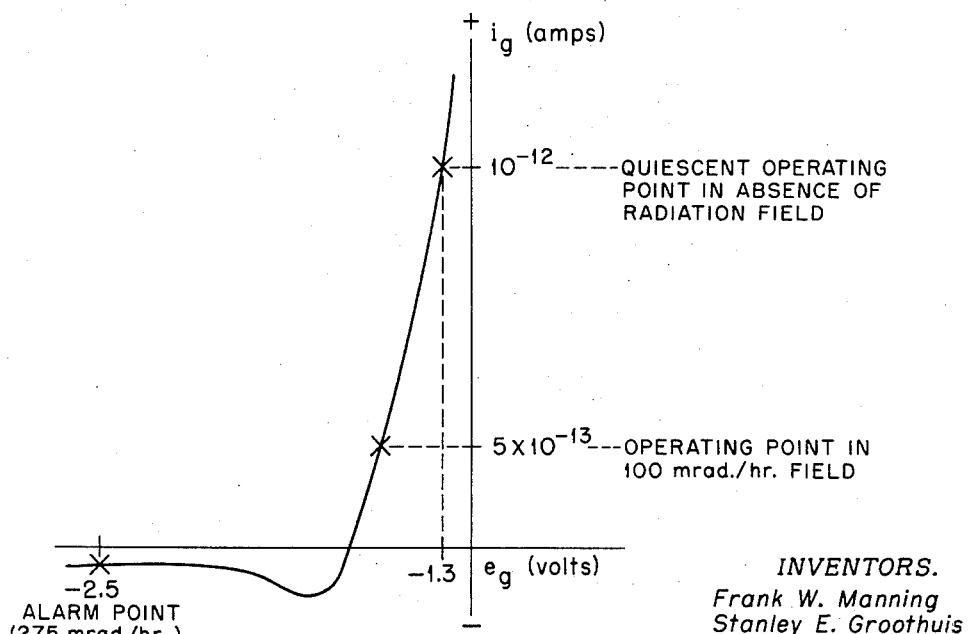
FIG. 3 is a graph presenting grid-current, grid-voltage operating characteristics of the electrometer tube of the system of FIG. 1.

The effect of the positive grid current is somewhat like that of a variable and automatically adjustable shunt across the chamber 3. In the presence of increasing background radiation, the resistance of the shunt increases abruptly—i.e., as indicated in FIG. 3, the positive grid current decreases appreciably because of a relatively small increase in the effective grid voltage—making a larger proportion of a constant current (to be described) available for charging the chamber, as desired. This action provides larger and thus better compensation for a predetermined background field without sacrificing reliability of response to an excursion.

Figure 4:
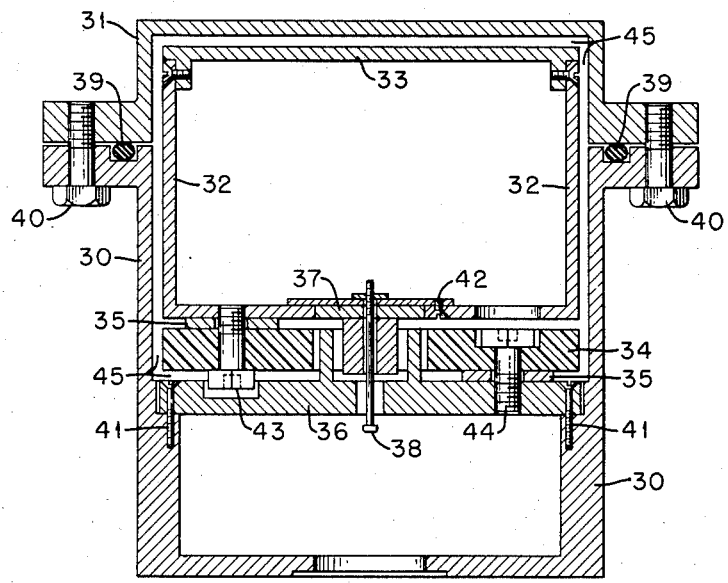
FIG. 4 is a cross-sectional view of one type of ionization chamber which may be used as the detecting chamber of the various embodiments of this invention.

FIG. 4 illustrates one form of construction of an ionization chamber which may be used with the system of FIG. 1. The inner electrode of the chamber comprises a cup-shaped member 32 with a centrally disposed member 37 fixed within a central opening in the lower portion of member 32. Member 32 has a cover plate 33 affixed thereto by any suitable fastening means such as screws, as shown. A brass extension 38 of the inner electrode assembly is provided and extends through member 37 and fastened thereto as shown in the drawing. The outer electrode assembly of the ionization chamber includes a cylindrical cup-shaped member 30 encompassing member 32 and closely spaced therefrom, and a mating cup-shaped member 31 surrounding member 32 and member 33 of the inner electrode assembly and closely spaced therefrom to form an ionization chamber 45, as shown. Members 30 and 31 are fastened together by means of a plurality of bolts 40 mounted in mating flanges of members 30 and 31. An O-ring 39 provides an airtight seal between members 30 and 31. Member 30 is provided with a central opening in the bottom thereof. Member 30 is also provided with an offset seat portion upon which an annular shielding plate 36 rests and is affixed thereto such as by means of screws 41. Brass extension 38 of the inner electrode assembly extends through a central opening in shielding plate 36. An annular plastic insulator 34 is disposed between annular plate 36 and a portion of the bottom section of cup-shaped member 32. A spacing washer 35 is disposed between insulator 34 and member 32. A bolt 43 passes through insulator 34, washer 35 and threadedly engages an opening in member 32. Another washer 35 is disposed between insulator 34 and plate 36. A bolt 44 passes through insulator 34, washer 35 and threadedly engages an opening in plate 36. The inner electrode assembly is thus insulatingly spaced from the outer electrode assembly. A threaded screw 42 is provided for holding in place a plate which supports the brass extension 38. The entire device is filled to atmospheric pressure with argon gas, a gas exhibiting a low probability of forming negative ions.

Referring now to FIG. 5, there is illustrated an idealized graph, not to scale, of the magnitude and direction of current flows in the circuit of FIG. 1. FIG. 6 is a graph illustrating the shape of the ideal grid-current-grid-potential characteristic used in the derivation of FIG. 5. In FIG. 5, currents flowing into a circuit element (i.e., the tube 6 or chamber 3) are designated as negative, and currents flowing away from these circuit elements are designated as positive. The directions of the current flows shown in FIG. 1 are the directions of electron current flow in the various circuits. As indicated in FIG. 5, when there is no background radiation present, the grid current $I_3$ and the current $I_5$ are the same. In the presence of background radiation below a selected threshold dose-rate, the difference between currents $I_5$ and $I_3$ constitutes a nulling current $I_2$. $I_5$ is made essentially constant by selecting sufficiently high positive grid current and resistance 4 values to cause the potential drop across the resistance 4 to be very much greater than any voltage change across the chamber 3. The nulling current $I_2$ shown in FIG. 5 is equal to the discharge (radiation) current $I_1$ up to the selected threshold. At the threshold and above, $I_2$ corresponds to $I_5$ and will remain substantially constant, since $I_3$ has been reduced essentially to zero. The discharge current $I_1$ from chamber 3 is proportional to the dose rate. After the dose rate exceeds the threshold, $I_1$ will be greater than $I_2$. The excess ($I_4$) of $I_1$ over $I_2$ is then integrated by the capacitance of chamber 3; current $I_4$ is shown in the graph of FIG. 5. It should be noted that since $I_2$ is equal to $I_1$ up to the threshold, the chamber 3 does not start to integrate until after the threshold is passed. When a selected integrated value of $I_4$ has been reached corresponding to a selected radiation dose, the voltage across the chamber capacitance has decreased to a corresponding selected value and an alarm is given. The capacitance across chamber 3 has been shown in FIG. 1 by a condenser connected across the chamber by dashed lines. This has been shown in this manner for the sake of clarity in understanding the operation of this embodiment.

Although the embodiment of FIG. 1 responds, alarm-wise, only to current integrated above the threshold value, it will be understood that the circuit also integrates current below the threshold in the sense that re-charging of the chamber results from integrating the charging current.

In the embodiment of FIG. 1, the ionization chamber is used as both the radiation detector and as the current integrator. However, these detecting and integrating functions may be provided by separate components, if desired. FIG. 7 illustrates an embodiment of this invention in which a conventional scintillator-and-photomultiplier-tube arrangement 54 is used as the radiation detector and in which a standard operational integrator is used for integrating. The negative terminal of a battery 51 is connected in a line 52 to the cathode 53 of a standard photomultiplier tube 55; the tube 55 is mounted to receive light from a standard scintillation crystal 56 which is responsive to nuclear radiation. The positive terminal of battery 51 is grounded. The anode of the photomultiplier tube 55 is connected by a line 57 to a diode 65 whose cathode is grounded. The junction of the tube 55 anode and the diode 65 is designated as X. The positive terminal of a battery 66 is connected by a line 67, a large value resistor 58, and line 59, to the junction X. As shown, junction X is connected by a line 60 to a standard diode 131 whose anode is connected by line 62 to a standard operational integrator 75. Integrator 75 includes a D.C. amplifier 63 and a condenser 69. Amplifier 63 and condenser 69 are connected in a series circuit and to line 62 as follows. Line 62 is connected by a line 132 to amplifier 63, which in turn is connected by a line 64, line 71, and line 70, to one plate of condenser 69. The other plate of condenser 69 is connected by a line 68, and line 61 back to line 62. The output of integrator 75 is connected by a line 72 to a meter or alarm device 73, which in turn is grounded by a line 74.

The output voltage of D.C. amplifier 63 is proportional to the integral of the current input. It is a characteristic of the integrator 75 that the junction of lines 132, 61 and 62 remains at a constant voltage during all operational stages of this embodiment. Thus, in FIG. 7 the current $I_5$ is substantially constant throughout the operation of the device. As indicated in the graph of FIG. 8, the difference between the diode 65 current $I_3$ and the constant current $I_5$ constitutes the nulling current $I_2$. Up to the threshold dose-rate value, the nulling current $I_2$ equals the photomultiplier current $I_1$, which is proportional to the dose-rate. When the threshold has been reached, $I_3$ has decreased to zero because of the characteristics of diode 65, and $I_2$ now corresponds to $I_5$. The excess ($I_4$) of $I_1$ over $I_5$ is integrated by the operational integrator 75. As in FIG. 1, the embodiment of FIG. 7 will not start to integrate until the threshold has been passed. Thus, compensation of incident background radiation below a selected threshold dose-rate value is also accomplished in FIG. 7 on a continuous basis. The selected threshold and the alarm dose for FIG. 7 may be the same as those for FIG. 1, or at any other desired values.

Figure 9:
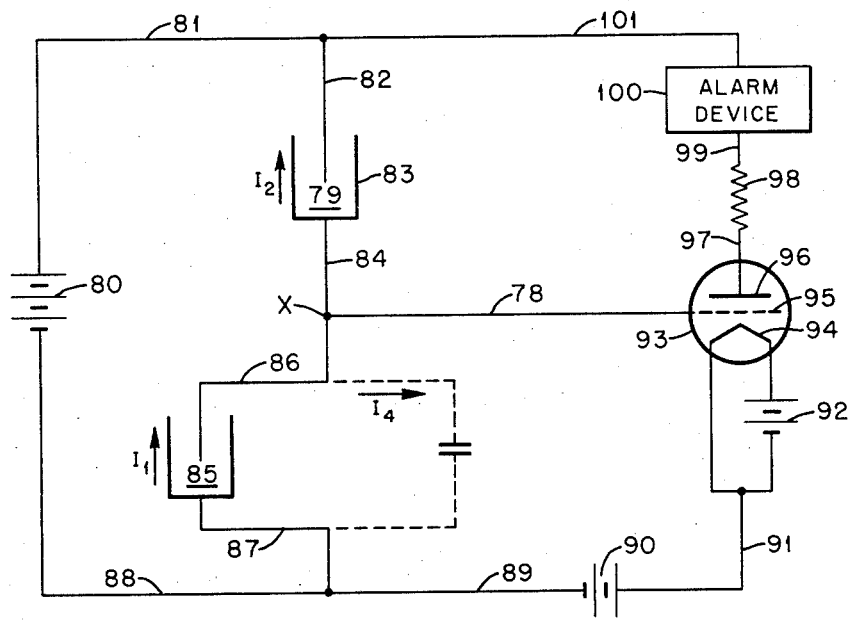
FIG. 9 is a schematic wiring diagram of still another embodiment of this invention.

The nulling current for the ionization chamber may be supplied by a second ionization chamber provided with a constant source of ionizing radiation, such as an alpha emitter. The second chamber is selected to be substantially less sensitive to external radiation than the first chamber. Such an arrangement is illustrated in the embodiment of FIG. 9. In this embodiment, the positive terminal of a battery 80 is connected by a line 81, and a line 82 to the central electrode of an ionization chamber 79 which contains a constant radiation source. The outer electrode 83 of chamber 79 is connected by a line 84, and a line 86 to the central electrode of an ionization chamber 85. The outer electrode of chamber 85 is connected by a line 87 and a line 88 to the negative terminal of battery 80. The junction X of lines 84 and 86 is connected by a line 78 to the grid 95 of a tube 93. The plate 96 of tube 93 is connected by a line 97, load resistor 98, and a line 99 to an alarm device 100, which in turn is connected by a line 101 to the junction of lines 81 and 82. The cathode 94 of tube 93 is heated by a heater circuit which includes a battery 92. This heater circuit is connected by a line 91 to the positive terminal of a grid biasing supply 90. The negative terminal of supply 90 is connected by a line 89 to the junction of leads 87 and 88. The capacitance across chamber 85 is shown as a separate condenser connected across the chamber by the dashed lines in the interest of clarity for the same reasons set forth above for FIG. 1.

Since the sensitivity of chamber 79 to external radiation is small relative to that of chamber 85 and since chamber 79 is biased with an internal radiation source, the nulling current $I_2$ will equal the current $I_1$ until the current $I_2$ reaches its maximum value, which is a function of the size of the bias source and which is selected so that the maximum $I_2$ is equal to $I_1$ at the desired threshold dose-rate. The discharge current $I_1$ from the other chamber 85 is proportional to the dose-rate. In the event of a nuclear excursion generating a radiation field above the threshold value, the excess ($I_4$) of $I_1$ over $I_2$ is integrated by the ionization chamber 85. The relationship of currents $I_1$, $I_2$, and $I_4$ are illustrated graphically in FIG. 5. As in FIG. 1, the chamber 85 of FIG. 9 will not start to integrate until after the threshold has been passed. The integrated excess of current $I_1$ over current $I_2$ will provide an alarm in a manner similar to that for FIG. 1 when an accumulated dose of a selected value has been received. It should be evident that the embodiment of FIG. 9 also compensates on a continuous basis for incident background radiation below a selected threshold value. The selected threshold dose-rate and alarm dose for FIG. 9 may be the same as those for FIG. 1, or at any other desired values.

Figure 10:
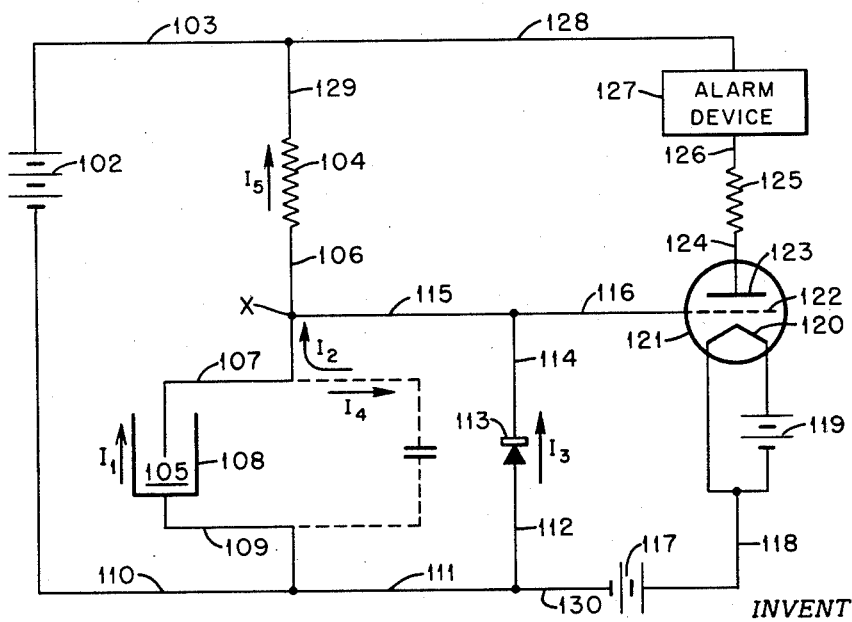
FIG. 10 is a schematic wiring diagram of yet another embodiment of this invention.

The embodiment of FIG. 10 illustrates another system in which the principles of this invention may be carried out. Charging current for an ionization chamber 105 is supplied from the positive terminal of a battery 102, through a line 103, a line 129, a resistor 104, a line 106, and a line 107 to the inner electrode of the chamber 105. The outer electrode 108 of a chamber 105 is connected by a line 109, and a line 110 to the negative terminal of battery 102. The junction X between lines 106 and 107 is connected by a line 115 and a line 116 to the grid 122 of a tube 121. The junction between lines 103 and 129 is connected by a line 128 to an alarm device 127, which in turn is connected by a line 126, resistor 125, and a line 124 to the plate 123 of tube 121. The cathode 120 of tube 121 is connected to a heater circuit which includes a battery 119. This heater circuit is connected by a line 118 to the positive terminal of a grid biasing supply 117. The negative terminal of supply 117 is connected by a line 130 and a line 111 to the junction of lines 109 and 110. A zener diode 113 is connected on one side by a line 114 to the junction of lines 115 and 116, and is connected on its other side by a line 122 to the junction of lines 111 and 130. It can be seen that the diode 113 is connected in shunt to the ionization chamber 105. Diode 113 acts as a non-linear element across the chamber 105 and performs the same function as the grid current of the electrometer tube 6 of FIG. 1. Other non-linear elements may be substituted for the zener diode 113 of FIG. 10, such as a biased diode or a VR tube. All of these non-linear elements have the same characteristics; that is, a small change in voltage will produce a substantial change in their output current.

As in FIG. 1, the capacitance across chamber 105 of FIG. 10 is shown as a separate condenser connected by the dashed lines for the same reasons as in FIG. 1. The operation of FIG. 10 is substantially the same as that for FIG. 1 with the exception that the current $I_3$ is provided by the diode 113 instead of the grid circuit of tube 121. The current $I_5$ is essentially constant. The graph of FIG. 5 may also be referred to in an understanding of the operation of the embodiment of FIG. 10. When the nulling current $I_2$ is exceeded by the discharge current $I_1$ the chamber 105 will then start to integrate the excess. When the integrated excess reaches an alarm dose, the voltage across chamber 105 will be reduced and the effective grid voltage of tube 121 will have reached such a value that the alarm device 127 is actuated. The chamber 105 will not start to integrate until the current $I_1$ exceeds the nulling current $I_2$. Thus, continuous compensation for incident background radiation below a selected threshold value is also achieved in the embodiment of FIG. 10.

The output line 116 of FIG. 10 may be connected to a separate integrator, if desired, in a manner similar to that for FIG. 7.

The embodiments of FIG. 7 and FIG. 10 may be provided with a reset switch in the same manner as for FIG. 1, if desired.

It should be apparent that various modifications could be made in the systems described above without departing from the principles of this invention. For example, other types of radiation detectors could be employed. In addition, the D.C. supplies, the biasing supplies, and the load resistors may be made adjustable so as to provide a selection of alarm points.

What is claimed is:

1. A radiation dose alarm device comprising means for generating a first current proportional to the incident dose rate, means for continuously generating a second, nulling current, said generating means increasing said nulling current in accordance with increasing background radiation up to a selected threshold dose rate value, means for connecting said first and second currents to thus null out said first current with said second current at all values of said first current corresponding to dose rates below said selected threshold dose rate value to thereby automatically compensate for said background radiation up to said threshold dose rate, said nulling current having a maximum value corresponding to that of said first current at the threshold dose rate, means for integrating the excess of said first current over said second current which occurs above the threshold, and alarm means connected to said integrating means and responsive to a selected integrated value of said excess corresponding to a selected radiation dose.

2. The device set forth in claim 1, wherein the means for generating said first current comprises an ionization chamber, said chamber also serving as said integrating means.

3. The device set forth in claim 1, wherein the means for generating said first current comprises a scintillator-and-photomultiplier tube device, the means for generating said second current comprises a battery connected in series with a very large resistor, means for connecting said resistor and said tube device to a junction point therebetween, a first diode connected to ground and to said junction point, said integrating means comprising a D.C. amplifier in parallel with a condenser, a second diode, and means for connecting said integrating means in series with said second diode and with said junction point.

4. The device set forth in claim 1, wherein the means for generating said first current comprises an ionization chamber, said device further including a circuit element which is connected across said ionization chamber and whose resistance varies sharply and inversely with the voltage applied thereto, the resistance of said circuit element becoming essentially infinite at a selected value of the voltage applied thereto, said circuit element having said infinite resistance when said nulling current reaches its maximum value at said threshold dose rate.

5. A detector for nuclear reactions which produce dangerous bursts of radiation, and which is consistently sensitive to said bursts even in the presence of continuous background radiation, comprising: radiation detector including a charging impedance and a charge-storage capacitance connected in a series circuit; first power supply means connected across said series circuit to continuously charge said capacitance and provide a voltage thereacross; a lock-in relay provided with a coil and a set of contacts; a control tube provided with a cathode, plate, and grid electrodes; a load resistor; said relay coil, load resistor, and control tube being connected in a second series circuit; means for connecting said second series circuit across said first power supply means; an alarm device; a second power supply means; said relay contacts, said alarm device, and said second power supply means connected in third series circuit, said contacts being closed to actuate said alarm device responsive to drop of current flow through said coil below a selected amount; means for connecting the grid electrode of said tube to a junction between said impedance and one terminal of said capacitance; and a grid-bias D.C. supply connected between said cathode electrode of said tube and the second terminal of said capacitance, said grid bias supply being connected in opposition to said voltage across said capacitance to thus provide an effective grid voltage for said tube which is the difference between said capacitance voltage and said grid bias supply, said effective grid voltage being selected to cause said tube to draw a selected value of positive grid current, said grid current being diverted to said charge-storage capacitance, thereby providing a greater charging rate for said capacitance for compensation of background radiation below a selected threshold on a continuous basis, said effective grid voltage dropping to a value in the presence of a radiation excursion such that the current flow through said coil falls below said selected amount, thus actuating said alarm device.

6. The detector set forth in claim 5, wherein said terminals of said capacitance are closely spaced to form an ionization chamber, said chamber being filled with argon gas.

7. The detector set forth in claim 5, wherein a reset switch is connected between the positive terminal of said grid bias supply and said one terminal of said capacitance to provide a fast charging circuit for said capacitance.

8. A detector for nuclear reactions which produce dangerous bursts of radiation, and which is continuously sensitive to said bursts even in the presence of continuous background radiation, comprising: a radiation detector including a charging impedance and a charge-storage ionization chamber connected in a series circuit, power supply means connected across said series circuit to provide a constant current and to continuously charge said chamber and provide a voltage thereacross; a variable and automatically adjustable circuit element connected in shunt across said ionization chamber, said element having a resistance which varies sharply and inversely with the voltage applied thereto, said element voltage beig determined by the voltage across said chamber, said element supplying a variable current to a junction point between said impedance and said chamber as a function of said resistance to thereby provide a nulling current to said chamber in accordance with the difference between said constant current and said variable current, said chamber having a discharge current as a function of the incident dose rate received by said chamber, said nulling current nulling out said discharge current at all values of said discharge current corresponding to dose rates below a selected threshold dose rate value to thereby automatically compensate for said background radiation up to said threshold dose rate, said nulling current having a maximum value corresponding to that of said discharge current at the threshold dose rate, said chamber integrating the excess only of said discharge current over said nulling current which occurs above the threshold, and alarm means connected to said circuit element and responsive to a selected integrated value of said excess corresponding to a selected radiation dose.

9. The detector set forth in claim 8, wherein said circuit element is a control vacuum tube with a cathode, plate, and control grid, a grid biasing supply connected to said tube and having a polarity opposite to that of said chamber to thus provide an effective grid voltage for said tube, said grid of said tube being connected to said junction point between said impedance and said chamber and supplying said variable current in the form of a positive grid current to said junction point up to said threshold dose rate.

10. The detector set forth in claim 8, wherein said circuit element is a zener diode connected across said chamber.

References Cited in the file of this patent
UNITED STATES PATENTS

| | | |
|---|---|---|
| 2,596,500 | Molloy | May 13, 1952 |
| 2,596,956 | Nierman | May 13, 1952 |
| 2,728,861 | Glass | Dec. 27, 1955 |
| 2,817,768 | Shamos | Dec. 24, 1957 |
| 2,874,305 | Wilson | Feb. 17, 1959 |
| 2,982,857 | Clarke | May 2, 1961 |